United States Patent [19]

Tebbe

[11] Patent Number: 5,753,378
[45] Date of Patent: May 19, 1998

[54] LAMINATED STRUCTURAL MATERIAL AND METHOD FOR PRODUCING SAME

[76] Inventor: Jan Herman Lucien Tebbe, Konijnenber 88D, NL-4802 AA Breda, Netherlands

[21] Appl. No.: 765,373

[22] PCT Filed: Jun. 20, 1995

[86] PCT No.: PCT/NL95/00219

§ 371 Date: Dec. 19, 1996

§ 102(e) Date: Dec. 19, 1996

[87] PCT Pub. No.: WO95/35209

PCT Pub. Date: Dec. 28, 1995

[30] Foreign Application Priority Data

Jun. 20, 1994 [NL] Netherlands ............... 9401013

[51] Int. Cl.⁶ ................ B32B 3/12; E04H 1/12
[52] U.S. Cl. .......... 428/537.1; 156/292; 156/297; 442/23; 428/68; 428/411.1
[58] Field of Search ............ 428/537.1, 411.1, 428/532, 76, 68; 442/23; 156/292, 297, 288

[56] References Cited

U.S. PATENT DOCUMENTS

| | | |
|---|---|---|
| 3,110,643 | 11/1963 | Downing ................ 428/537.1 X |
| 3,427,216 | 2/1969 | Quinn ................ 428/537.1 X |
| 4,865,912 | 9/1989 | Mitsumata ................ 428/537.1 X |
| 5,264,062 | 11/1993 | Ohsumi et al. ................ 428/537.1 X |

FOREIGN PATENT DOCUMENTS

| | | | |
|---|---|---|---|
| 0068873 | 1/1983 | European Pat. Off. ......... | B32B 3/12 |
| 0122905 | 10/1984 | European Pat. Off. ......... | B32B 15/10 |
| 2225282 | 11/1974 | France ........................ | B32B 15/00 |
| 2259801 | 8/1975 | France ........................ | C04B 43/00 |
| 2292812 | 6/1976 | France ........................ | E04B 1/94 |
| 2216387 | 10/1973 | Germany .................... | E04C 2/26 |
| 2935093 | 3/1981 | Germany .................... | E04B 1/82 |
| 8131739 | 3/1982 | Germany .................... | E04F 19/04 |

*Primary Examiner*—Daniel Zirker
*Attorney, Agent, or Firm*—Webb Ziesenheim Bruening Logsdon Orkin & Hanson, P.C.

[57] ABSTRACT

A laminated structural material includes at least one load-bearing layer manufactured from cellulose-composite material and a protective covering layer connected thereto on at least one side. The covering layer includes a plastic foil laminated to a metal foil such as aluminum foil.

20 Claims, 3 Drawing Sheets

# LAMINATED STRUCTURAL MATERIAL AND METHOD FOR PRODUCING SAME

BACKGROUND OF THE INVENTION

1. Field of the Invention

The invention relates to a structural material, particularly for use in building simple housing. More specifically, the invention relates to a structural material comprising at least one load-bearing layer manufactured from cellulose-composite material and a protective layer comprising a metal foil connected thereto on at least one side.

2. Description of the Prior Art

The laminated structural material disclosed in EP-A-0 122 905 is comprised of a cellulose based load-bearing panel, for instance, a chipboard panel or a flax fiber panel, which is coated with a moisture-proof layer, for instance, an aluminum foil or luminized paper layer. This moisture proof layer is adhered to the load-bearing panel by means of a polyvinylalcohol adhesive. Also, a decorative outer layer, for instance a PVC layer, may be connected to the panel. The structural material is intended to be used for paneling walls or ceilings.

Various other documents describe structural materials made of cellulose-composite layers covered with a protective layer. Examples of such publications are EP A-0 068 873 and FR-A-2 292 812, which both disclose structural materials based on a cardboard core, DE-A-29 35 093, DE-A-22 16 387 and FR-A-2 225 282, which all describe structural materials with a wood based core, and FR-A-2 259 801, which describes a sandwich panel having a core of fire-proof cellulose waste material DE-U-81 31 739 describes a composite skirting-board having a wooden core and aluminum and PNVC outer layers In order to provide living accommodations in developing regions and to provide assistance to refugees, migrants and victims of natural disasters, as well as for reconstruction after calamities and acts of war, there is usually a demand for construction, in a rapid and effective manner, of houses which fulfill the requirements of shelter, stability and insulation. It is important here to be able to have available a structural material which has sufficient rigidity and strength for building applications, which can withstand varying climatological conditions and which can be produced and transported in large quantities quickly and at low cost.

SUMMARY OF THE INVENTION

The invention provides for this purpose a structural material of the type described above, which is characterized in that the covering layer is a laminate comprising at least one plastic foil having a grid structure arranged on the metal foil. Cellulose-composite material combines a relatively great rigidity and strength with a low weight and is moreover comparatively inexpensive. Providing this material with a protective covering layer ensures that the good structural properties of the cellulose-composite material are preserved irrespective of the climatological conditions under which the material is used. The metal foil, for instance, an aluminum foil, is moisture-impermeable and cannot be penetrated by vermin and also has a favorable ratio of strength to weight. The grid structure of the plastic foil furthermore serves to protect the underlying metal from damage. A preferred material for this purpose is a polyamide gauzes For optimum protection the load-bearing layer of cellulose-composite material is preferably provided on both sides or even on all sides with a covering layer.

The laminate may comprise a plurality of foils of different types of plastic, one of which can serve, for instance, as a finishing layer, for simple decoration.

The load-bearing layer and the protective layer are preferably connected by a polyethylene adhesive layer. Similarly, polyethylene adhesive layers may be used between the various foils of the laminate.

The structural material preferably has a plurality of load-bearing layers, at least one of which is manufactured partially of wood. The structural material can hereby be fixed with simple screwed or nailed connections to, for instance, a frame.

The invention also has for its object to provide a method for producing comparatively large quantities of structural material rapidly and at a low cost. The invention provides to this end a method for producing a laminated structural material comprising: shaping a layer of cellulose-composite material into a desired form, selecting at least one covering layer comprising a metal foil, shaping the covering layer into a form corresponding with that of the cellulose-composite layer, and mutually connecting the cellulose-composite material and the covering layer. The covering layer is a laminate including a plastic foil arranged on a metal foil having a grid structure.

BRIEF DESCRIPTION OF THE DRAWINGS

The invention is now elucidated on the basis of a number of embodiments, wherein reference is made to the annexed drawings, wherein corresponding parts are designated with the same reference numerals, and wherein.

DETAILED DESCRIPTION OF THE PREFERRED EMBODIMENTS

Figure 1:
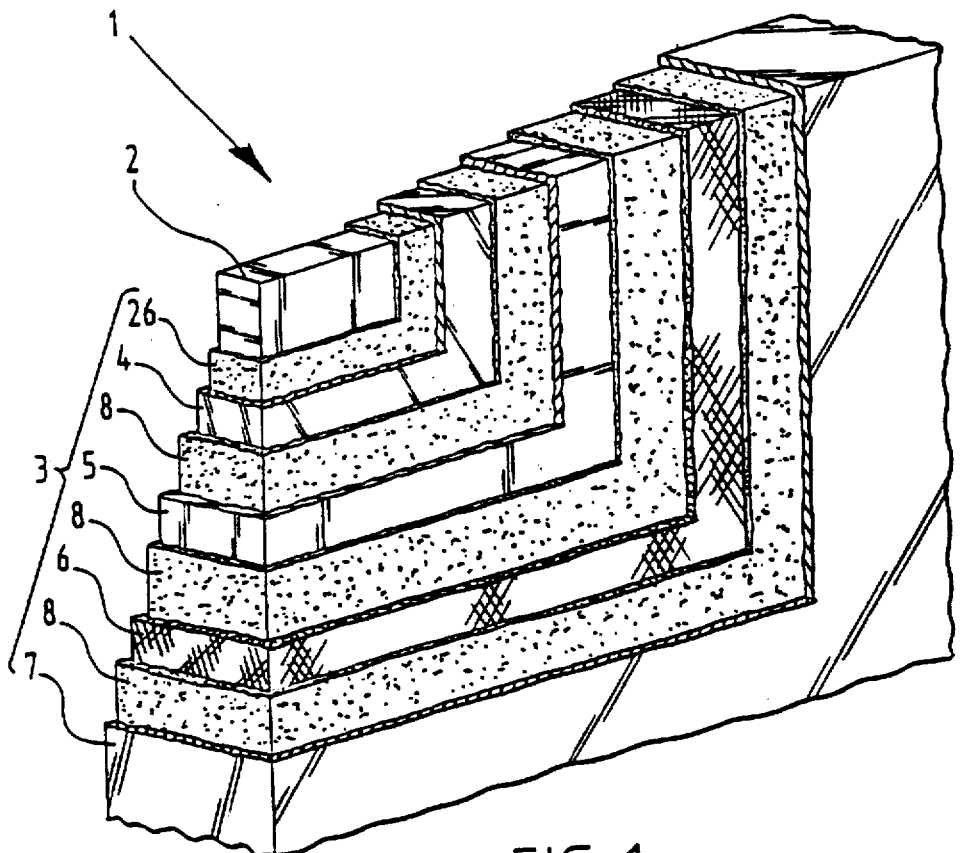
FIG. 1 shows a partly broken away perspective view of a plate of structural material according to a first embodiment of the invention.

With reference to FIG. 1, a structural material 1 comprises a load-bearing layer 2 which is manufactured from cellulose-composite material and covered on all sides with a protective layer 3 which is fixed to the cellulose-composite material with interposing of an adhesive layer 26, for example, of polyethylene. Polyethylene adheres well, is heat resistant and can withstand UV radiation well. The protective layer 3 is a laminate consisting of a number of foils 4, 5, 6, 7 which are mutually joined by adhesive layers 8, for instance, a polyethylene glue. The most important foil is a metal foil 5, for example, an aluminum foil, which protects the cellulose-composite material 2 against moisture and moreover cannot be penetrated by vermin. Between aluminum foil 5 and cellulose-composite material 2 is arranged a connecting layer 4 which is likewise made of cellulose material. This connecting layer 4 ensures that the laminate 3 can be adhered in a simple manner to the cellulose-composite material 2. For protection of the aluminum foil 5, a relatively strong plastic foil 6 is arranged which has a grid-like structure. Polyamide gauze can, for instance, be used for this purpose. Finally, the laminate 3 comprises a finishing layer 7 which is formed, for instance, by a plastic foil, for simple decoration. Polyester, which can be printed in a simple manner with a decoration, can be used herefor. The plastic foils 6 and 7 protect the laminate not only against damage but also against excessive heat build-up under the influence of sunlight, whereby the adhesion of adhesive layers 8 and 26 could be affected and delamination occurs.

Figure 2:
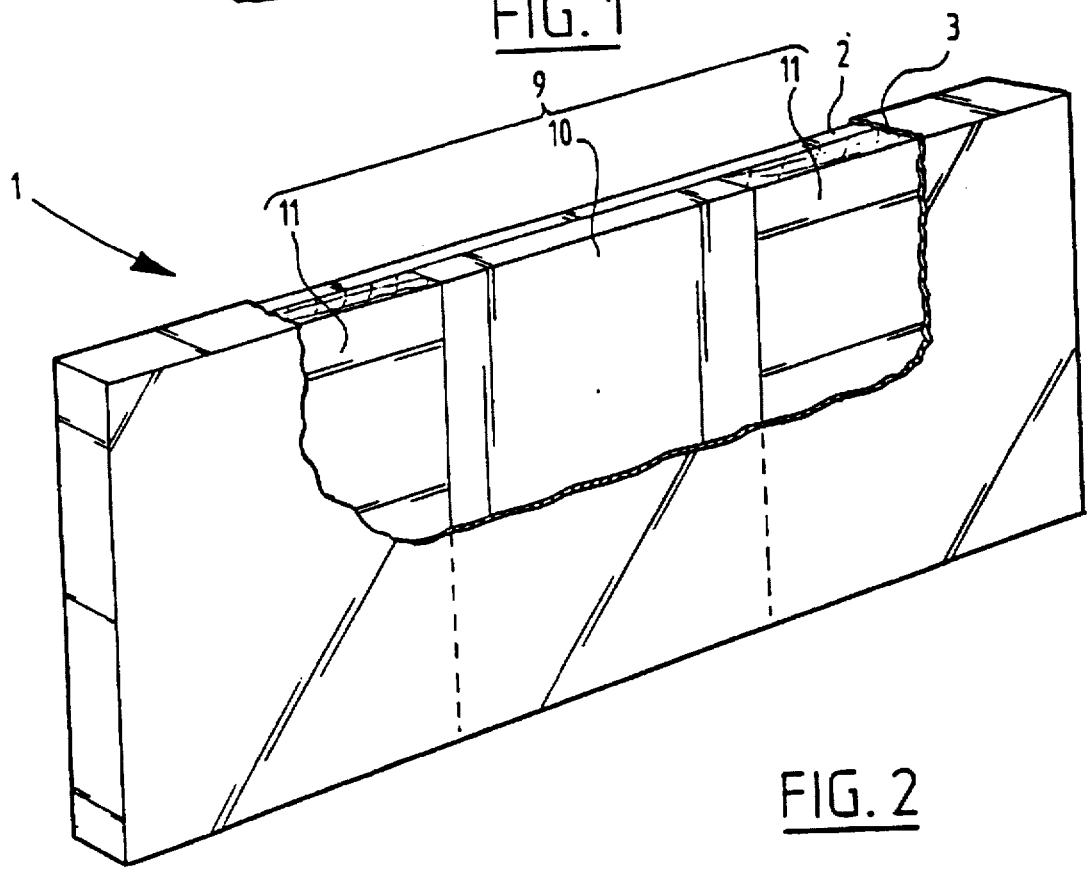
FIG. 2 shows a partly broken away perspective view of a plate of structural material according to a second embodiment.

With reference to FIG. 2, in an alternative embodiment of the structural material, an additional load-bearing layer 9 is arranged on the layer of cellulose-composite material 2, which layer 9 consists of a central part 10 of cellulose-composite material and wooden parts 11 arranged on either side thereof. The extra load-bearing layer 9 will, of course, increase the rigidity of structural material 1, while addition of wooden panels 11 enables the option of connecting the plate of structural material 1 by means of screws or nails to, for instance, a frame or another plate of the same structural material. When structural material 1 has to be used in regions with extreme climatological conditions, it may be desirable to arrange between the load-bearing layers a layer of insulation material, such as plastic foam or glass wool.

Figure 3:
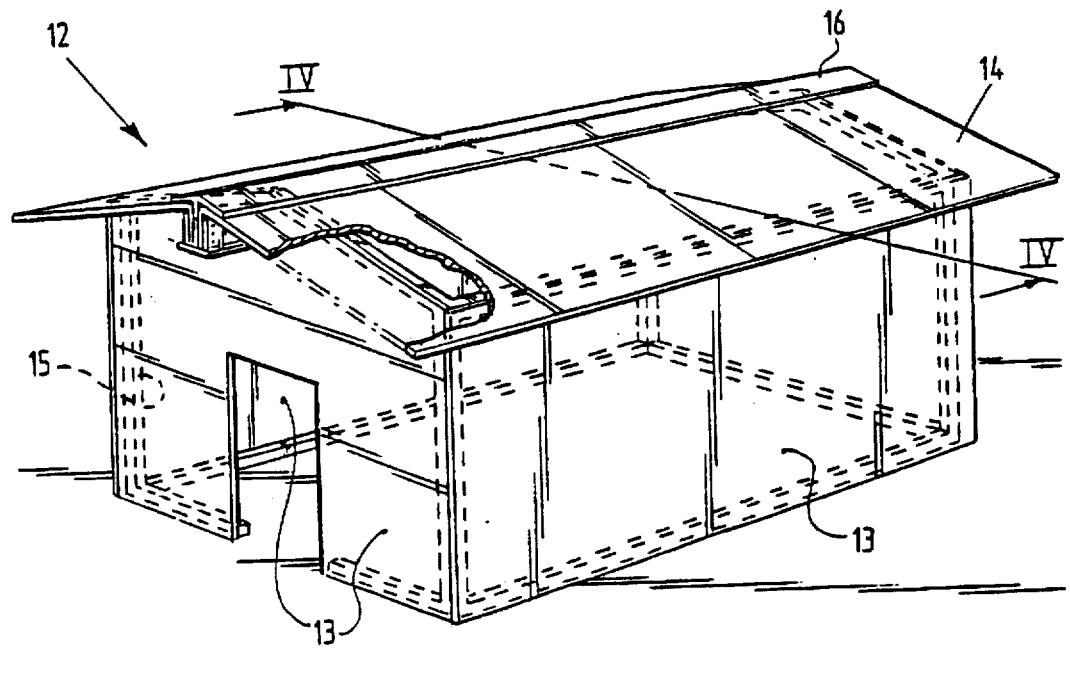
FIG. 3 is a perspective view of a house constructed with the structural material according to the invention.
Figure 4:
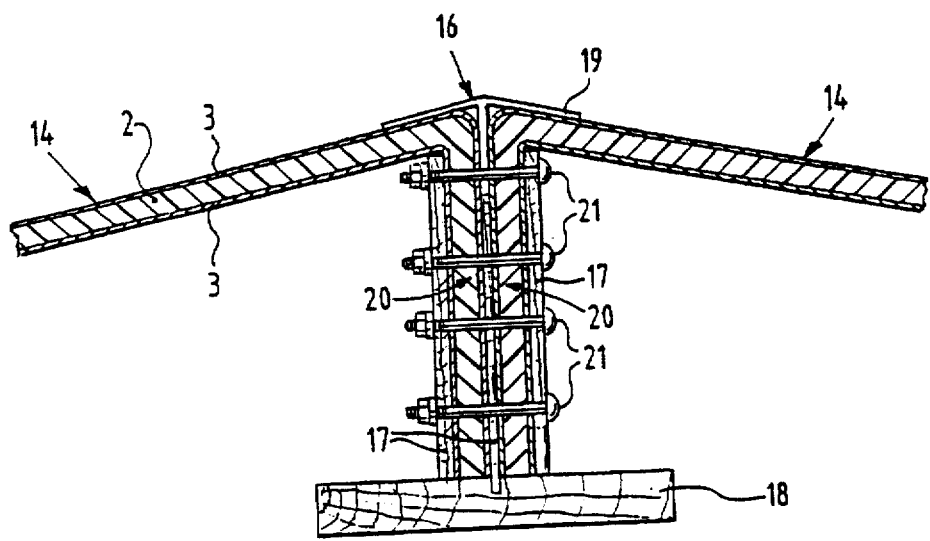
FIG. 4 is a sectional view on an enlarged scale along the line IV—IV in FIG. 3.

The structural material as described above fulfills technical requirements of structural strength and stability, is in addition comparatively light and can be produced in large quantities quickly and simply. The structural material therefore lends itself very well to use in the building of emergency accommodations, while due to its low cost price, it is also excellently suited for the building of semi-permanent houses in regions with a great housing shortage, such as for instance, in large cities in developing countries. With reference to FIG. 3, such a house can be assembled simply from a number of wall panels 13 and roof panels 14 of the above-described laminated structural material manufactured integrally to size. The panels can herein be mutually connected in a cantilevered manner or fixed to a frame is. This latter construction method is recommended when the house is exposed to extreme climatological conditions, for instance, tropical hurricanes. It is not, in any way, essential herein to use flat panels, as these panels may have any desired shape. With reference to FIG. 4, in order, for instance, to join the two roof panels 14 at the position of the ridge 16, it may be desirable to make use of panels 14 with a bent edge portion 20. These end portions 20 can then, with interposing, for instance, of wooden filler layers 17, be mutually joined by means of fastening elements 21. The ridge construction 16 is then completed by arranging a fillet 18 and a cover piece 19.

Figure 5:
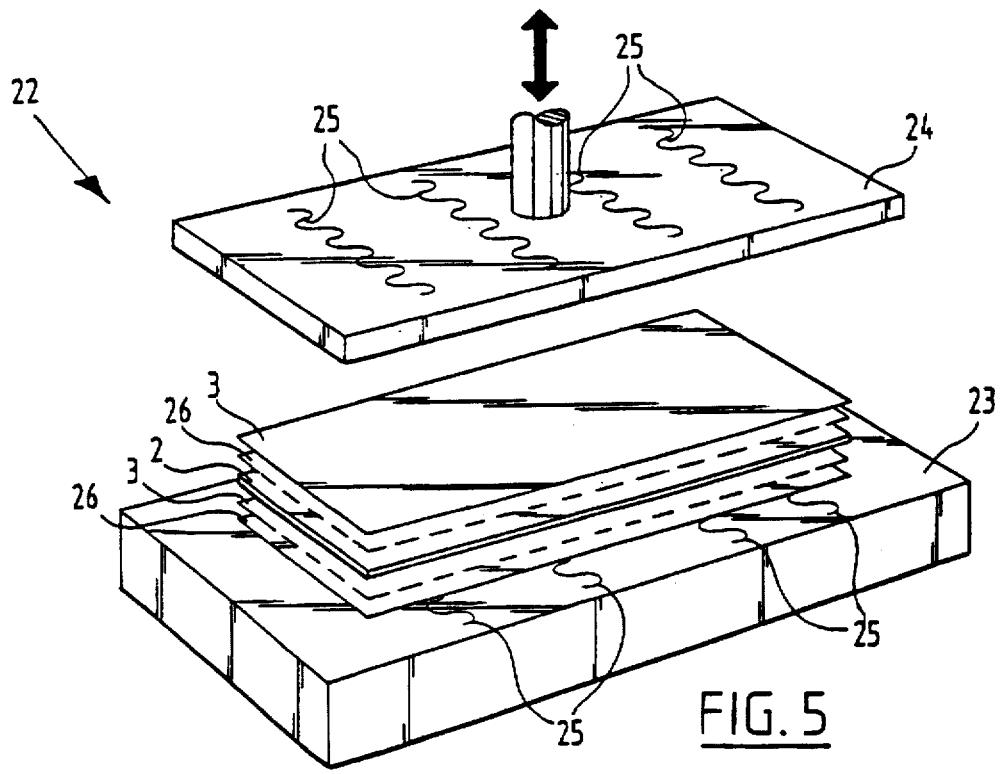
FIG. 5 is an open perspective view of an apparatus for producing the structural material.

With reference to FIG. 5, the structural material 1, according to the invention, can be produced simply by placing a plate of cellulose-composite material 2 cut to size together with one or more covering layers 3 and adhesive layers 26 in a pressing installation 22 which consists of a table 23 and a movable upper stamp 24. Table 23 and upper stamp 24 can herein be provided with heating elements 25. By pressing upper stamp 24 onto table 23 while the heating elements 25 are switched on, a good adhesion between the layer of cellulose-composite material 2 and the covering layers 3 is ensured by the heated adhesive layers 26.

Figure 6:
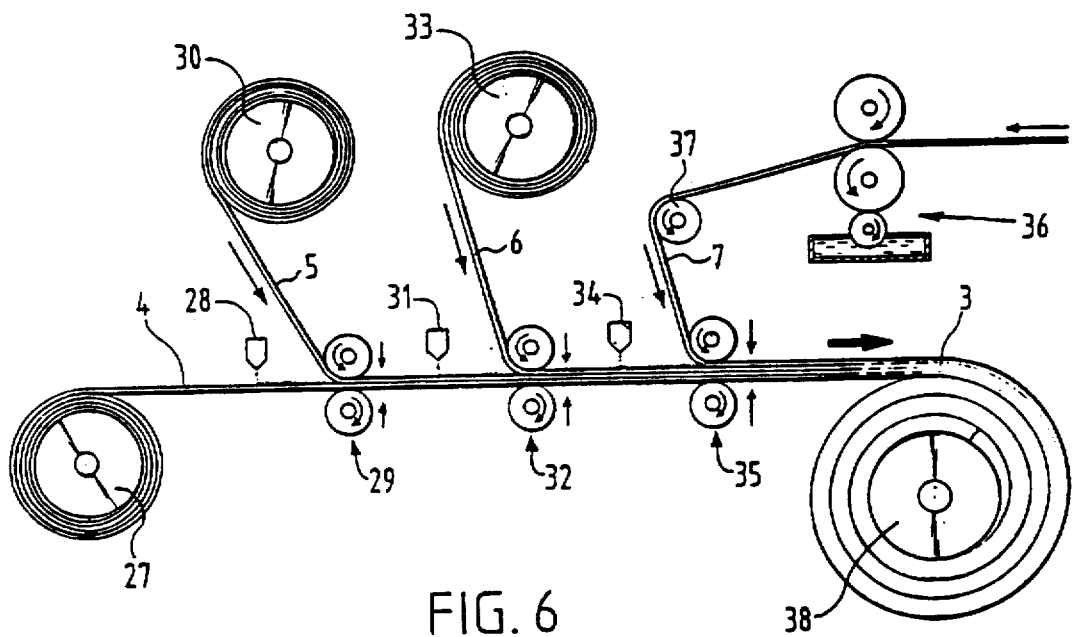
FIG. 6 is a side elevational view of an apparatus for producing a covering layer.

With reference to FIG. 6, the covering layer 3 is formed by mutually laminating the foils 4, 5, 6, 7. To this end, the foil of cellulose material 4 is unwound from a stock roll 27, provided in a first adhering station 28 with a first adhesive layer 8 and in a first laminating station 29 laminated with the metal foil 5 unwound from a supply roll 30. The thus formed intermediate product passes through a second adhering station 31 and in a second laminating station 32 is subsequently laminated with the plastic gauze 6 which is unrolled from a roll 33. After passing through a third adhering station 34, the intermediate product is laminated with the decorative finishing layer 7 in a third laminating station 35. This layer 7 is printed with a decoration in a printing station 36. The finally produced laminate 3 is wound onto a supply roll 38 for further use.

With the described method a structural material can thus be produced in a simple and rapid manner and at little cost which can be applied for constructing semi-permanent houses quickly and at a low cost.

I claim:

1. A structural material comprising: at least one load-bearing layer of cellulose-composite material and a protective covering layer comprising a metal foil connected to the load-bearing layer on at least one side, wherein the covering layer is a laminate comprising at least one plastic foil having a grid structure joined to the metal foil.

2. The structural material as claimed in claim 1, wherein the plastic foil is a polyamide gauze.

3. The structural material as claimed in claim 1, wherein the metal foil is an aluminum foil.

4. The structural material as claimed in claim 1, wherein the laminate comprises a plurality of foils of different types of plastic.

5. The structural material as claimed in claim 1, wherein the laminate comprises a connecting layer of cellulose material arranged on an outer side thereof.

6. The structural material as claimed in claim 1, wherein the laminate comprises on at least one side thereof a decorative finishing layer.

7. The structural material as claimed in claim 1, wherein said protective covering layer is connected to said load-bearing layer by a adhesive layer.

8. The structural material as claimed in claim 1, wherein said foils are mutually joined by adhesive layers.

9. The structural material as claimed in claim 7, wherein said adhesive layer comprises a polyethylene adhesive.

10. The structural material as claimed in claim 1, further including a plurality of load-bearing layers, at least one of which is manufactured at least partially of wood.

11. The structural material as claimed in claim 1, further including at least one layer of insulating material connected to the load-bearing layer.

12. A building at least partially constructed from a laminated structural material comprised of at least one load-bearing layer of cellulose-composite material and a protective covering layer comprising a metal foil connected to the load-bearing layer on at least one side, wherein the covering layer is a laminate comprising at least one plastic foil having a grid structure joined to the metal foil.

13. A method for producing a laminated structural material comprising the steps of: shaping a layer of cellulose-composite material into a desired form, selecting at least one covering layer comprising a metal foil, shaping said covering layer into a form corresponding with that of said cellulose-composite layer, and mutually connecting the cellulose-composite material and the covering layer, wherein said covering layer includes a plastic foil having a grid structure joined to the metal foil.

14. The method as claimed in claim 13, wherein the covering layer is formed by laminating a plurality of foils of different types of plastic with said plastic grid foil.

15. The method as claimed in claim 14, wherein said foils are laminated by interposing polyethylene adhesive layers therebetween.

16. The method as claimed in claim 14, wherein an outer foil of the plurality of foils is printed with a decoration prior to lamination.

17. The method as claimed in claim 13, wherein the cellulose-composite material and the at least one covering layer are mutually connected under pressure.

18. A The method as claimed in claim 13, wherein the cellulose-composite material and the at least one covering layer are mutually connected at an increased temperature.

19. The method as claimed in claim 13, wherein the cellulose-composite material and the at least one covering layer are mutually connected by interposing a polyethylene glue layer therebetween.

20. The method as claimed in claim 13, wherein at least a second load-bearing layer manufactured at least partially from wood is fixed onto the layer of cellulose-composite material before connecting thereof to the covering layer.

* * * * *

UNITED STATES PATENT AND TRADEMARK OFFICE
CERTIFICATE OF CORRECTION

PATENT NO. : 5,753,378
DATED : May 19, 1998
INVENTOR(S) : Jan Herman Lucien Tebbe It is certified that error appears in the above-identified patent and that said Letters Patent is hereby corrected as shown below:

Title Page, under [76] Inventor, "Konijnenber" should read --Konijnenberg--.

Column 1 Line 32 after "waste material" insert period --.--.

Column 1 Line 34 "PNVC" should read --PVC--.

Column 1 Line 34 after "outer layers" insert period --.--.

Column 1 Line 64 "gauzes" should read --gauze--.

Column 1 Line 64 after "gauze" insert period --.--.

Column 3 Line 38 "frame is." should read --frame 15.--.

Claim 18 Column 5 Line 7 "A The method" should read --The method--.

Signed and Sealed this

Twenty-second Day of December, 1998

Attest:

BRUCE LEHMAN

Attesting Officer

Commissioner of Patents and Trademarks